United States Patent [19]

Westell

[11] Patent Number: 4,841,317
[45] Date of Patent: Jun. 20, 1989

[54] WEB HANDLING DEVICE
[75] Inventor: William E. Westell, Weston, Mass.
[73] Assignee: Honeywell Inc., Minneapolis, Minn.
[21] Appl. No.: 189,084
[22] Filed: May 2, 1988
[51] Int. Cl.[4] .................. G03B 37/02; H04N 3/36; B65H 16/00
[52] U.S. Cl. ............................ 354/65; 242/55; 358/214
[58] Field of Search .............. 242/55; 355/27-29; 354/65, 71; 358/214

[56] References Cited
U.S. PATENT DOCUMENTS 3,160,082 12/1964 Lysle .............................. 354/64 X
3,744,387 7/1973 Fuller ................................. 354/64
4,613,093 9/1986 Takakura et al. .................... 242/55
4,772,952 9/1988 Liem ................................. 358/214

Primary Examiner—Donald A. Griffin
Attorney, Agent, or Firm—Charles J. Ungemach

[57] ABSTRACT

A web storage and handling system employing two concentric rings of rollers. The web is wound around the outer of the concentric arrangement and therefrom wound around the inner of the concentric arrangement. From the inner of the concentric arrangement the web passes over two canted idlers to be removed from the plane of the concentric rings to permit viewing and final storage.

16 Claims, 1 Drawing Sheet

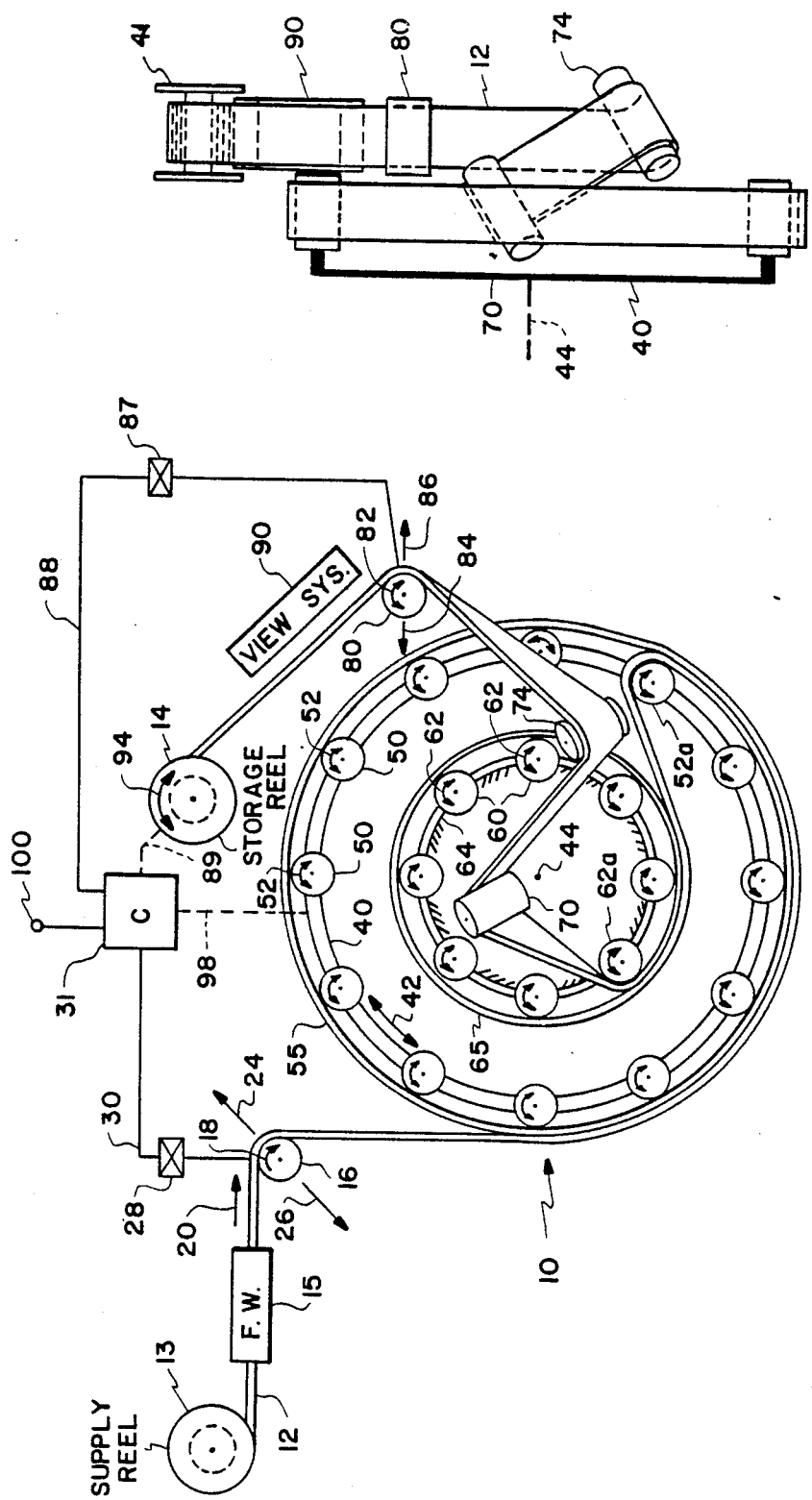

WEB HANDLING DEVICE

BACKGROUND OF THE INVENTION

1. Field of the Invention

The present invention relates to web handling and storage apparatus as, for example, photographic film used in a reconnaissance airplane.

2. Description of the Prior Art

The storage and handling of long webs of material such as film or tape is often a difficult problem. For example, when it is desired to view a film at various speeds, including reverse and still, and the film is stored in a storage mechanism that may be receiving tape at the same time, a number of problems are encountered. An example of a system that has been used widely in the prior art is referred to as a "slack box" in which the film is stored loosely in a container and withdrawn therefrom for viewing at any desired rate. The difficulty with such a system is that the film can become tangled, particularly in situations where violent movement may be involved such as when the system is used in aircraft. A system which solves this problem is found in a co-pending application Ser. No. 935,905 of T. Khoen Liem filed Nov. 28, 1986 and assigned to the assignee of the present invention and now U.S. Pat. No. 4,772,952 issued Sept. 20, 1988. In this disclosure, a plurality of rollers each independently rotatable about their own axis are mounted on a member which rotates about a central axis. The film is wound around the rollers to provide an interim storage. When desired, the inner layer of film is removed from the interior of the coil and passed by a viewing mechanism mounted on the rotatable member and taken up in a second storage reel, also mounted on the rotatable member. The second rotatable member can withdraw the film at any speed desired or stop entirely or, even reverse, and does so without becoming tangled. There are, however, several difficulties encountered in the apparatus described in the above-mentioned co-pending application. The electrical signals to and from the optical viewing system have to be brought out through slip rings which create noise and have other disadvantages and the rotating member must remain dynamically balanced and be very large in order to carry both the take-up reel and th film viewing system.

SUMMARY OF THE INVENTION

The present invention provides a web storage and handling system which does not require the viewing mechanism and take-up reel to be mounted for rotation on the same member as the interim storage apparatus but still provides a closely controlled system which does not become tangle even during violent aircraft maneuvers.

More particularly the present invention contemplates utilizing two pluralities of rollers, arranged around a common center with each roller being rotatable about its own individual axis. One of the two roller arrangements is mounted on a member for rotation about a central axis, while the other of the two arrangements of rollers is fixed. For convenience here in, the web will be described as generally travelling from a supply reel to the outer of the two arrangements then to the inner of the two arrangements and finally to a storage reel but, it should be understood that the opposite movement would work equally well. Also, for simplicity, the inner and outer arrangements of rollers will be described as concentric but it should be understood that strict concentricity is not required.

The web is received from a supply reel around the outer concentric arrangement of rollers to form a first coil for interim storage. One of the rollers in the outer arrangement operates as a "finger" to reverse the direction of the web and cause it to be wound or unwound about the inner concentric arrangement of rollers as the rotatable member moves in the first or opposite direction. The web is removed from the inside of the inner coil by a pair of canted rollers which bring the web out of the plane of rotation of the concentric roller arrangement past a viewing system to a final storage reel. By this arrangement, the viewing system and storage reel are not part of the rotatable system, thus removing the need for bringing electrical signals out through slip rings and yet the winding of the web on the two concentric interim storage reels provides a neat and controlled arrangement for the web so as to prevent entanglement.

BRIEF DESCRIPTION OF THE DRAWINGS

FIG. 1 shows a top view of the apparatus of the present invention; and

FIG. 2 shows a side view of the apparatus of FIG. 1.

DETAILED DESCRIPTION OF THE PREFERRED EMBODIMENT

Although the present invention may find use in all sorts of web handling apparatus, it will be described herein in connection with an aircraft reconnaissance film handler as was the film handler in the above-mentioned co-pending application. In FIG. 1, the film handling and storage apparatus of the present invention is shown generally by reference numeral 10 receiving a web 12 of material such as film from a supply reel 13 and depositing the film on a storage reel 14. Film 12 is shown passing a film writer 15, for exposure and development of the film, and then to a first tension sensing idler roller 16 which is free to rotate in a direction shown by arrow 18 as the film advances by the film writer 15 in the direction shown by arrow 20. The supply reel 13 and the film writer 15 may be the same is shown in the above mentioned co-pending application. Idler 16 is spring loaded for restrained movement in a direction shown by arrows 24 and 26 so as to take up film slack that may be produced by the supply reel 13. Idler 16 is connected to a transducer 28 which supplies a position signal output on a conductor 30 to a servo system controller 31 which operates to control the rotation of a rotatable member 40 in the film handling mechanism 10 so as to take up the film slack generated by rotation of either supply reel 13 or storage reel 14.

The rotatable member 40 of film handling mechanism 10 can rotate in either direction as shown by arrow 42 about a central axis 44. Rotatable member 40 has mounted thereon a plurality of rollers such as 50, each of which is free to rotate in either direction about its own axes as shown by arrows such as 52. Twelve such rollers are shown in FIG. 1, but there may be more or less than this number as a matter of design choice.

The film 12 after passing idler 16 is shown to wrap around the rollers 50 in a rather circular fashion as shown by reference numeral 55. Only about one and a half turns of film are shown coiled around rollers 52 in FIG. 1, but in actual practice, many turns of film may be so wound.

One of the rollers 52a is referred to herein as the "outer finger" and operates to direct the film 12 in the reverse direction so that it wraps around a second plurality of rollers 60 also rotatable about their own axes as is shown by arrows 62. Rollers 60 are shown mounted concentrically around axis 44 on a member 64, which does not rotate but, rather, is fixed as is shown by the hatched lines thereon. The two arrangements of rollers are shown to be substantially concentric about axis 44 and while this is a preferred arrangement, concentricity is not absolutely necessary. It is seen that after leaving outer finger 52a, the film wraps around the plurality of rollers 62 as shown by reference numeral 65. Only about one and a quarter turns of film are shown in the inner coil but, as with the outer coil, a large number of turns is usually encountered. Likewise, although 8 rollers are shown in the inner circle, this number may be chosen as desired.

One of the inner rollers 62a is referred to as the "inner finger" and operates to direct film towards the interior of the inner arrangement of rollers 60. A first canted roller 70 is shown receiving the film from inner finger 62a so as to direct it out of the plane formed by the concentric rollers as will be better seen in connection with FIG. 2

The film, after leaving the first canted roller 70 passes to a second canted roller 74 and passes therearound to a second tension sensing idler roller 80 which is free to rotate in either direction as shown by arrow 82. Idler 80, like idler 16, is spring loaded for restrained movement in opposite directions shown by arrows 84 and 86 so as to take up any slack produced by the system. Idler 80 is connected to a transducer 87 which supplies a position signal output on a conductor 88 to the servo system controller 31. Controller 31 operates to drive the storage reel 14 by a mechanical connection shown as a dashed line 89.

After passing around idler 80, the film passes by a viewing system shown by reference numeral 90 where it may be viewed by an operator as desired. The film is then fed to the storage reel 14 which is rotatable in either direction as shown by arrow 94 so as to allow film to be wound thereon or removed therefrom as desired. The controller 31 not only operates to rotate storage reel 14 by the mechanical connection 96 but likewise controls the rotation of member 40 about axis 44 by a mechanical connection shown as dash line 98. Controller 31 also receives signals at a terminal 100 which may be under the control of the operator for causing the storage reel 92 and interim storage reel 40 to move as desired in order to bring the film 12 to the correct position for viewing under viewing system 90. Controller 31 may be a set of standard servo mechanisms well known in the art and need not be further described herein.

In FIG. 2 only the outer interim storage reel 40 is shown for clarity. In FIG. 2 the canted rollers 70 and 74 are seen to lie at approximately 45 degrees to the plane of rotation of the interim storage reel carried by member 40. The film 12 is, with this arrangement, seen to exit the plane of the interim rollers 50 and 60 and come out at a new plane parallel thereto so as to pass first idler 80, then viewer 90 and then be supplied to storage reel 14. It should be understood that after leaving the plane of the rollers 50 and 60, the film may move in any desired and convenient direction for viewing and storage and that the parallel travel shown in FIGS. 1 and 2 is preferable for compactness, but is not absolutely necessary.

In operation, let it be assumed, for example, that the operator wishes to view a portion of the film and wants to stop the film for such viewing. In this event, he will supply a signal at terminal 100 and the controller 31 will stop storage reel 14 from moving so that the film in front of view system 90 will remain stationary. However, the film is still being supplied past film writer 15 causing slack film takeup by idler 16 to be sensed by transducer 28 and with storage reel 28 stopped, idler 80 will also take up slack and transducer 87 will sense the change. Transducers 28 and 80 will present changed signals on outputs 30 and 88 to controller 31 which will, in turn produce a changed output on connection 98 to cause rotation of the rotatable member 40 in a counterclockwise direction to increase the tension. Thus, while the film is stopped in front of the viewer 90, film will be wrapped around rollers 50 mounted on member 40 and around fixed rollers 60 by counterclockwise rotation of finger roller 52a.

Assume now that the operator wishes to rapidly advance the film 12 at the viewing system 90 in the forward direction. He will communicate this to the controller 31 via the input 100 and controller 31 will cause storage reel 14 to speed up to wind the film thereon at a rapid rate. This will result in an increased tension in the film which will be sensed by transducers 28 and 87 and this increased tension signal will be transmitted to controller 31 which will now produce a changed output on connection 98 that operates to slow down, stop, or even reverse the motion of rotatable member 40 depending upon the relative speed of the input and the fastforward.

Should the operator desire to reverse the film, storage reel 14 will be caused to move in the clockwise direction to release the film and the slackening in tension will be sensed by transducers 28 and 80 which will operate through controller 31 to speed up rotatable member 40 to the extent necessary to pull the film back into the system from idler roller 80 and canted rollers 74 and 70.

While I have shown the two concentric rings 40 and 64 to be fairly widely spaced apart for explanation purposes, in actual practice they may be much closer together, allowing only enough room for the tapes to pass therebetween. By this means, the size of the overall apparatus can be made quite small in comparison with the prior art. It will be obvious to those skilled in the art that the sequence of film supply and take up to the outer and inner roller arrangements can be reversed with equal effectiveness of operation and the relative rotatability of members 40 and 64 can be reversed. More particularly, reel 14 may operate as the supply reel and reel 13 may operate as the storage reel. In this event, viewing system 90 and film writer 15 would also be interchanged.

It is thus seen that I have provided a neat and compact method for handling and storage of web material which will allow the viewing thereof without slip rings and which is controlled in an orderly fashion so as to prevent tangling even during violent maneuvers thereof. Many obvious changes will occur to those skilled in the art and I do not wish to be limited to the specific disclosures used in connection with the preferred embodiments. I intend only to be limited by the following claims.

The embodiments of the invention in which an exclusive property or right is claimed are defined as follows:

1. Web handling apparatus for use with first and second web storage means, comprising:

a first plurality of rotatable members mounted proximate a first plane and arranged around a first axis, each rotatable member of the first plurality being rotatable about axes substantially perpendicular to the first plane;

a second plurality of rotatable members mounted proximate the first plane and arranged around the first axis and surrounding the first plurality, each rotatable member of the second plurality being rotatable about axes substantially perpendicular to the first plane;

canted means rotatable about an axis at an acute angle with the first plane, the web being wound around the first and second pluralities of rotatable members and the canted means between the first and second web storage means, the windings of web around the first and second pluralities being substantially parallel to the first plane, a predetermined one of the rotatable members of the first plurality operating to direct the web between the first and second pluralities and a predetermined one of the rotatable members of the second plurality operating to direct the web between the second plurality and the canted means so that the web is directed out of parallelity with the first plane between the second plurality and the second storage means; and control means operable to rotate the second plurality of rotatable members as a group around the first axis.

2. Apparatus according to claim 1 further including tension sensing means connected to sense tension in the web and to provide a signal in accordance therewith to the control means.

3. Apparatus according to claim 1 wherein the web moves from the first storage means to the second plurality, from the second plurality to the first plurality, from the first plurality to the canted means and from the canted means to the second storage means.

4. Apparatus according to claim 3 further including tension sensing means connected to sense tension in the web and to provide a signal in accordance therewith to the control means.

5. Apparatus according to claim 4 wherein the tension sensing means include idler roller means positioned between the first and second pluralities and the first and second storage means.

6. Apparatus according to claim 5 wherein the control means also controls the second storage means.

7. Apparatus according to claim 6 wherein the first and second storage means are supply and storage reels respectively and the control means controls the rotation of the storage reel.

8. Apparatus according to claim 7 wherein the web is film and further including viewing means positioned between the canted means and the storage reel for viewing the film.

9. Apparatus according to claim 8 further including film writing means positioned between the supply reel and the first plurality for producing images on the film for viewing by the viewing means.

10. Web storage and handling apparatus comprising:
rotatable means mounted for rotation about a first axis;

a first plurality of rotatable members mounted on the rotatable means to rotate on axes substantially perpendicular to a first plane and spaced about the first axis;

stationary means;

a second plurality of rotatable members mounted on the stationary means to rotate on axes substantially perpendicular to the first plane and spaced about the first axis, the first and second plurality of rotatable members lying generally in a first plane;

web supply means for moving a web along a path around the first and second plurality of rotatable members, one of the rotatable members operable to transfer the web between the first and second plurality of rotatable members; and canted means mounted for rotation about an axis at an acute angle to the first plane, the canted means receiving the web from one of the second plurality of members to transfer the web between the first plane and a second plane.

11. Apparatus according to claim 10 further including control means having an output and connected to rotate the first plurality of rotatable members around the first axis in accordance with the output.

12. Apparatus according to claim 11 further including a supply reel and a storage reel, the storage reel being connected to the control means so that the storage of web varies in accordance with the control means output.

13. Apparatus according to claim 12 further including viewing means positioned adjacent the path between the canted means and the storage means.

14. Apparatus according to claim 11 further including strain sensing means mounted adjacent the path to produce an output which varies with the tension on the web and means connecting the strain sensing means to supply a first input to the control means.

15. Apparatus according to claim 14 wherein the control means includes a second input to receive command signals from an operator.

16. Apparatus according to claim 10 wherein the one of the rotatable means reverses direction of the web so that the web winds around the first and second pluralities of rotatable means in opposite directions.

* * * * *

UNITED STATES PATENT AND TRADEMARK OFFICE
CERTIFICATE OF CORRECTION

PATENT NO. : 4,841,317

DATED : June 20, 1989

INVENTOR(S) : WILLIAM E. WESTELL

It is certified that error appears in the above-identified patent and that said Letters Patent is hereby corrected as shown below:

Title page:

Change Assignee from "Honeywell Inc." to --Honeywell Regelsysteme GMBH--

Signed and Sealed this

Twenty-fifth Day of June, 1991

Attest:

HARRY F. MANBECK, JR.

*Attesting Officer*

*Commissioner of Patents and Trademarks*